(12) United States Patent
Martin

(10) Patent No.: US 12,397,444 B2
(45) Date of Patent: Aug. 26, 2025

(54) S-Bar MECHANISM FOR FINGER JOINTS

(71) Applicant: SANCTUARY COGNITIVE SYSTEMS CORPORATION, Vancouver (CA)

(72) Inventor: Kyle Martin, Campbell, CA (US)

(73) Assignee: Sanctuary Cognitive Systems Corporation, Vancouver (CA)

(*) Notice: Subject to any disclaimer, the term of this patent is extended or adjusted under 35 U.S.C. 154(b) by 345 days.

(21) Appl. No.: 17/889,248

(22) Filed: Aug. 16, 2022

(65) Prior Publication Data
US 2023/0302661 A1 Sep. 28, 2023

Related U.S. Application Data

(60) Provisional application No. 63/233,610, filed on Aug. 16, 2021.

(51) Int. Cl.
*B25J 15/00* (2006.01)

(52) U.S. Cl.
CPC ................. *B25J 15/0009* (2013.01)

(58) Field of Classification Search
CPC .... B25J 15/0009; B25J 15/0028; B25J 15/10; B25J 15/12

USPC ................................. 294/86.4, 213
See application file for complete search history.

(56) References Cited

U.S. PATENT DOCUMENTS

| | | | | |
|---|---|---|---|---|
| 1,507,682 | A | * 9/1924 | Pecorella | A61F 2/583 623/64 |
| 4,367,593 | A | * 1/1983 | Whitworth | B25H 7/005 33/529 |
| 6,913,627 | B2 | * 7/2005 | Matsuda | B25J 9/104 623/64 |
| 7,222,904 | B2 | * 5/2007 | Matsuda | B25J 15/0009 294/111 |
| 7,766,405 | B2 | * 8/2010 | Matsuda | B25J 15/0009 901/31 |
| 11,376,746 | B2 | * 7/2022 | Cerruti | B25J 15/022 |
| 11,639,005 | B2 | * 5/2023 | Zhao | B25J 15/0206 74/479.01 |
| 2007/0018470 | A1 | * 1/2007 | Hayakawa | B25J 13/085 294/902 |
| 2023/0248546 | A1 | * 8/2023 | Martin | A61F 2/586 623/64 |
| 2023/0381973 | A1 | * 11/2023 | Martin | B25J 15/0009 |

* cited by examiner

*Primary Examiner* — Paul T Chin
(74) *Attorney, Agent, or Firm* — Adenike Adebiyi; Thomas Mahon

(57) ABSTRACT

Provided are mechanisms that mechanically couple finger joint motion in robots.

14 Claims, 20 Drawing Sheets

S-Bar MECHANISM FOR FINGER JOINTS

CROSS-REFERENCE TO RELATED APPLICATIONS

This application claims the benefit of U.S. Prov. Pat. App. 63/233,610, titled "S-Bar Mechanism for Finger Joints," filed 16 Aug. 2021. The entire content of each afore-listed patent filing is hereby incorporated by reference for all purposes.

BACKGROUND

In recent years, robotics have been improved through the use of machine learning. For example, reinforcement learning has been applied to robots to help robots learn how to complete a task through many trial-and-error attempts of the task. Reinforcement learning may allow a robot to learn through reward mechanisms that reward the robot when a task is performed correctly and penalize the robot when a task is not performed correctly. Through repeated actions the robot is able to learn to perform actions that maximize the reward and avoid actions that lead to penalties or lower rewards. However, it can be difficult to train a robot due to the large state space that is possible in the physical world. The dimensionality of the state space to explore in reinforcement learning may increase as degrees of freedom of control for a robot increase.

SUMMARY

The following is a non-exhaustive listing of some aspects of the present techniques. These and other aspects are described in the following disclosure.

Some applications include the reduction of state space via mechanical means to facilitate the use of machine learning to train robots.

Some applications include an S-bar mechanism for finger joints of robots.

Some aspects include a tangible, non-transitory, machine-readable medium storing instructions that when executed by a data processing apparatus cause the data processing apparatus to perform operations including the above-mentioned applications.

Some aspects include a system, including: one or more processors; one or more inertial measurement units; and memory storing instructions that when executed by the processors cause the processors to effectuate operations of the above-mentioned applications.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
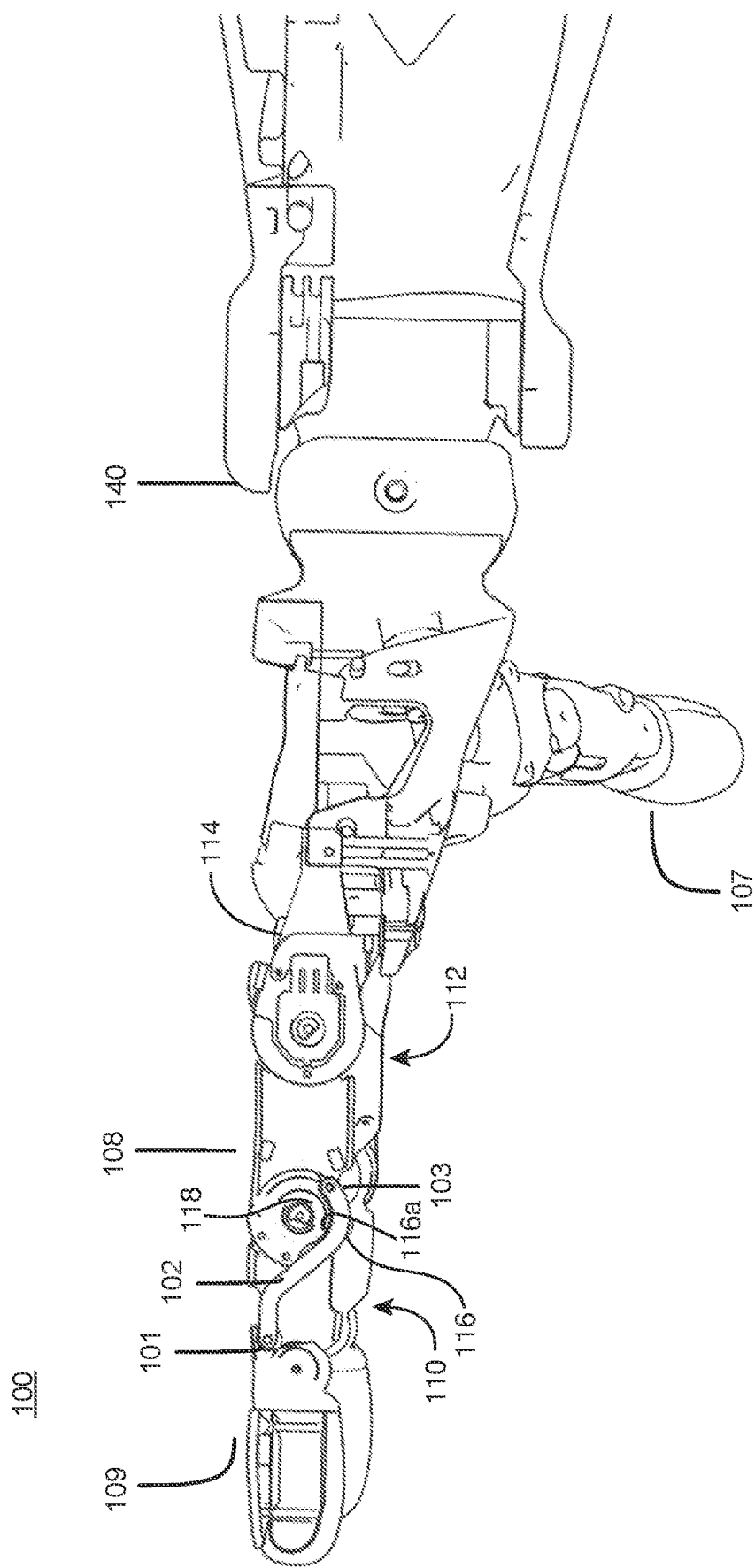
FIG. 1A shows an example hand of a robot system with a view of an S-bar.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of robotics and mechanical engineering. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments may include a robotic hand or other end effector like that shown in the figures. Some embodiments may use a mechanical linkage between joints of the end effector to reduce the number of degrees of freedom of the end effector and simplify the mechanical and control complexity of the same. In some embodiments related to hand-shaped end effectors, this allows the finger to still curl around an object, which is helpful for grasping, while removing the need for independent actuation, reducing cost and complexity for machine learning training. Alternative implementations may, by way of example, allow for the use of a rubberized, or flexible, linkage in order to allow for selective compliance at the outermost joints, in order to create a more robust grasp.

In some embodiments, rotation of the proximal interphalangeal joint may cause a corresponding rotation of the distal interphalangeal joint, in some cases, without the distal interphalangeal joint being independently actuated. In some cases, rotation of one is the same as rotation of the other, or in other cases, the s-bar and associated cams may cause rotation of one to effect a different amount of rotation of the other, e.g., with the distal joint being a smaller rotation, over a smaller range, than rotation of the proximal joint. In some cases, the distal joint may track the proximal joint in rotation through a first range of rotation and then cease tracking the proximal joint (and hold its position until the proximal joint rotates back below this threshold rotation) once a maximum rotation is reached (e.g., between 5 and 45 degrees, like between 10 and 25 degrees). (In these examples, angles of rotation are measured in a local frame of reference, as rotation about an upstream member of a kinematic chain. In some cases, the proximal interphalangeal joint and the distal interphalangeal joint may collectively have one and only one degree of freedom. In some cases, the distal joint may flex resiliently, e.g., more resiliently than the proximal joint, through such rotations. In some cases, each finger of the hand may have such an arrangement. In some cases, different fingers may have different s-bars or cams that translate motion from one joint to the other differently, e.g., over differing ranges of motion, or with different coefficients of relative rotation. In some cases, the thumb's distal joint is independently actuated relative to the proximal joint.

As discussed in more detail below in connection with FIGS. 2-4, a robot system (e.g., the robot system 302 (FIG. 3), the robot system 219 (FIG. 2A), etc. may be trained using machine learning (e.g., reinforcement learning) to perform tasks. Performing a task in the real world presents a challenge to reinforcement learning because of the large state space (e.g., the large number of actions that a robot can perform, the many positions or locations a robot can be in may be too numerous, etc.). To reduce the state space (e.g., which may make it easier to train a robot system), two portions of a robot hand may be joined such that joint motion is coupled together (e.g., one portion of a finger moves when a second portion of a finger moves). A physical mechanism may be used to mechanically couple distal finger joint motion together. For example, an s-bar may be used to join two joints together. Joining two joints using a mechanism (e.g., an s-bar) may allow the finger to still curl around an object (e.g., which may allow the robot to grasp objects), while removing the need for independent actuation. This may reduce the cost and complexity for machine learning training (e.g., as described in connection with FIGS. 2-4). In some embodiments, alternative implementations such as a rubberized, or flexible, linkage may be used, for example, to allow for selective compliance at one or more joints (e.g., the outermost joints of the robot hand). A rubberized, or other flexible linkage may allow the robot to create a more robust grasp.

FIG. 1A shows a cross-sectional view of an example robot hand 100 (e.g., the pinky of the robot hand 100). An S-bar 102 may be used to mechanically couple a distal phalange 109 with an intermediate phalange 108 and form a distal interphalangeal joint 110 between the distal phalange 109 and the intermediate phalange 108. A proximal interphalangeal joint 112 may be formed between the intermediate phalange 108 and a proximal phalange 114. A thumb 107 and a wrist 140 are shown for reference. The s-bar 102 is attached to the pinky of the robot hand 100. The s-bar 102 includes a curved bar section 116 with a curved surface 116a slidably engaged with a cam 118 formed on the intermediate phalange 108. The s-bar 102 may be made out of a rubberized material (or other flexible material), metal, plastic, fiberglass, or a variety of other materials.

Figure 1B:
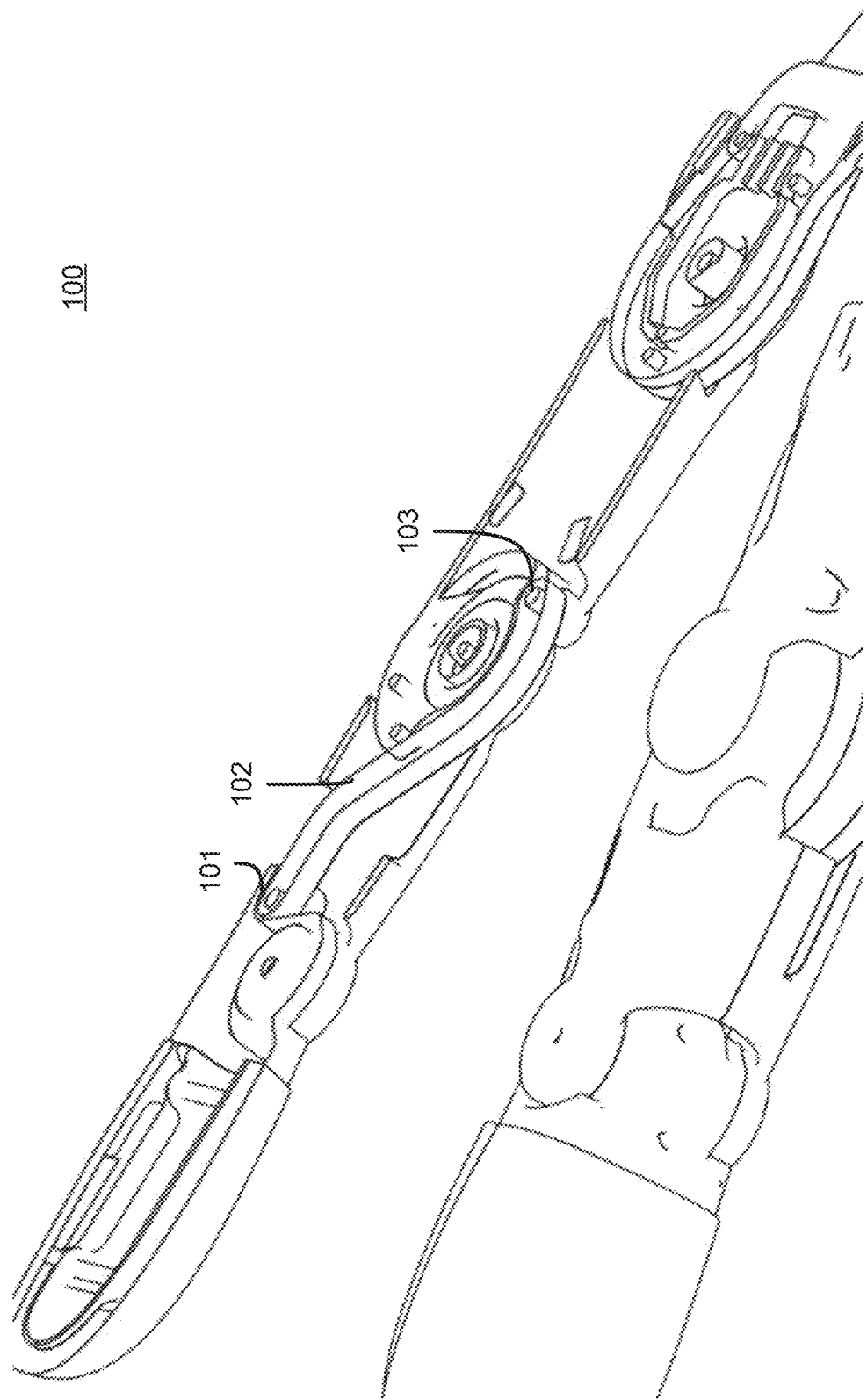
FIG. 1B shows an example bottom-up view of an S-bar of a robot hand.

FIG. 1B shows an additional view of the robot hand 100. The s-bar 102 may be attached to a finger of the hand at location 101 and location 103.

Figure 1C:
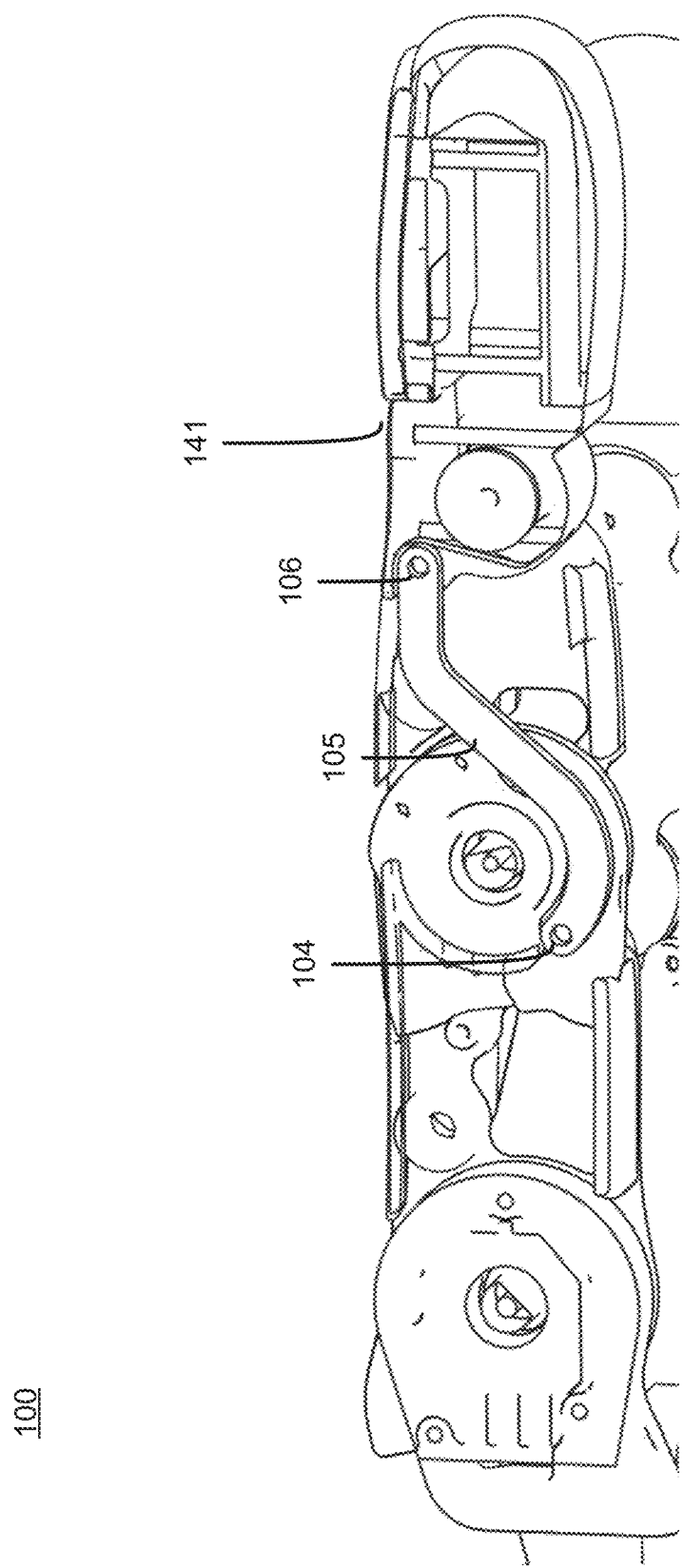
FIG. 1C shows example side view of an S-bar of a robot hand.

FIG. 1C shows an additional view of an index finger 141 of the robot hand 100. The s-bar 105 may be attached to the index finger 141 of the hand at location 104 and location 106.

Figure 1D:
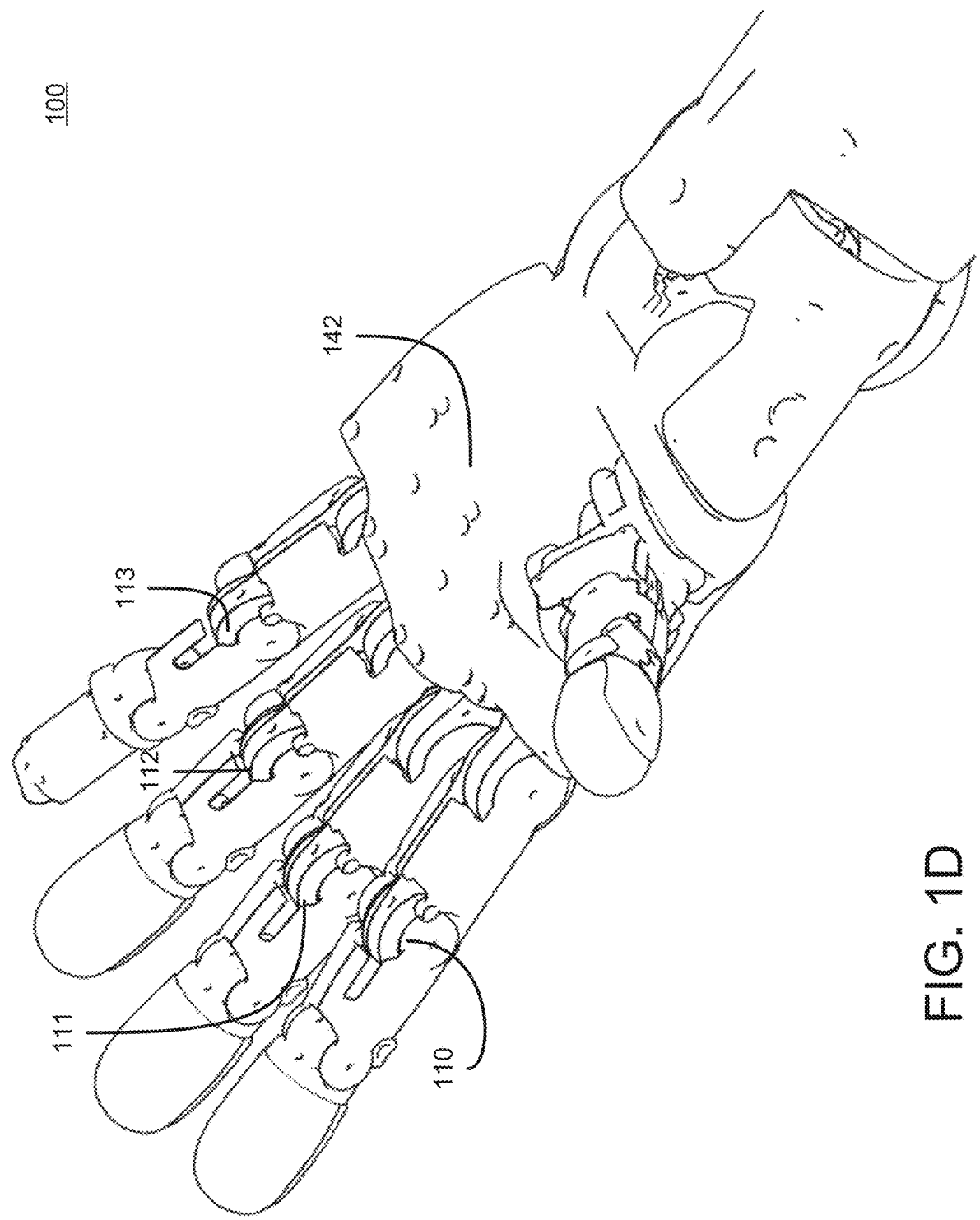
FIG. 1D shows an example palm view of a hand of a robot system with S-bars.
Figure 1E:
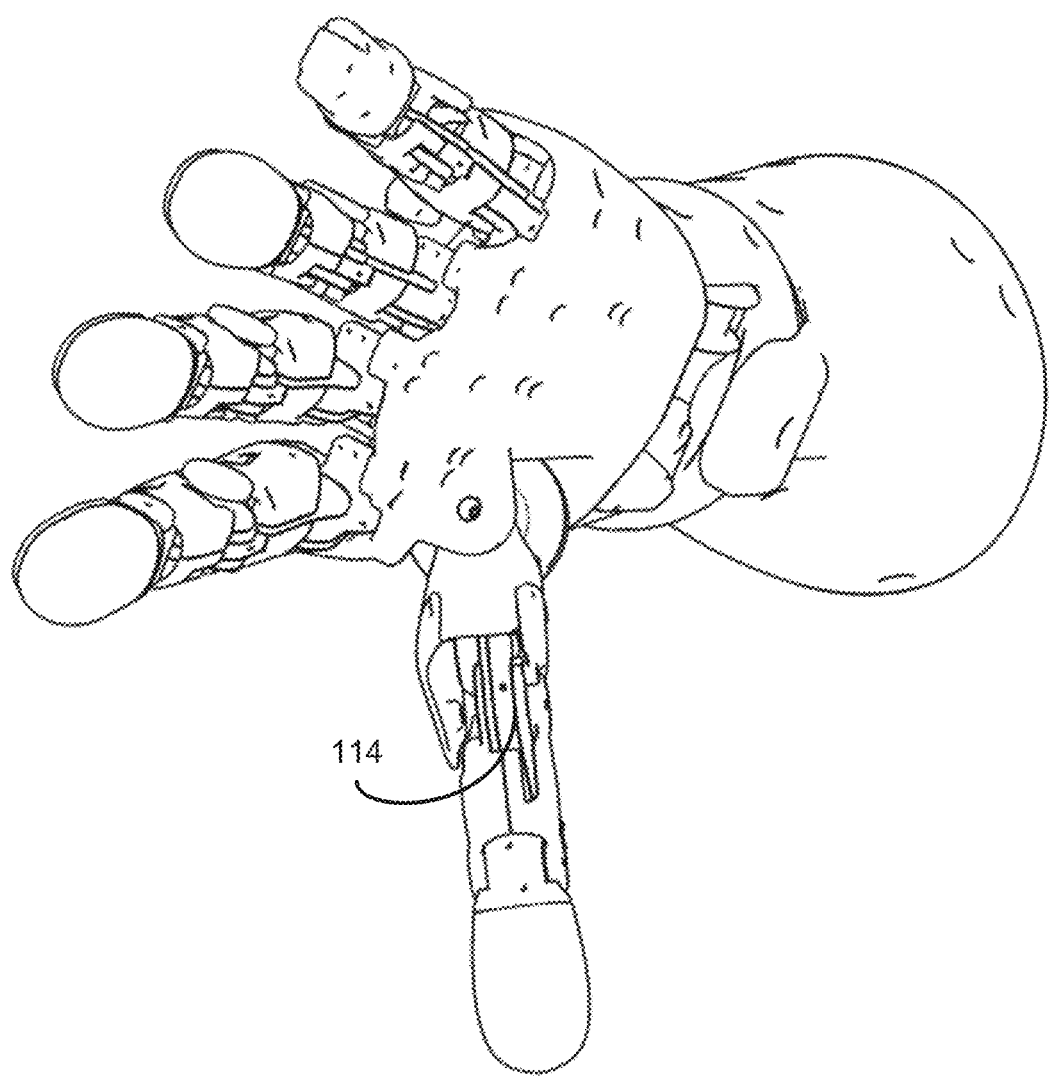
FIG. 1E shows an example view of a thumb of a robot system with an S-bar.

FIG. 1D shows an additional view of the robot hand 100 with the palm 142 of the robot facing up. S-bar mechanisms 110-113 may be used to mechanically couple corresponding intermediate and distal phalanges on fingers of the hand. Referring to FIG. 1E, an s-bar mechanism 114 may be used to mechanically couple an intermediate and distal phalange of a thumb of the robot hand 100.

Figure 1F:
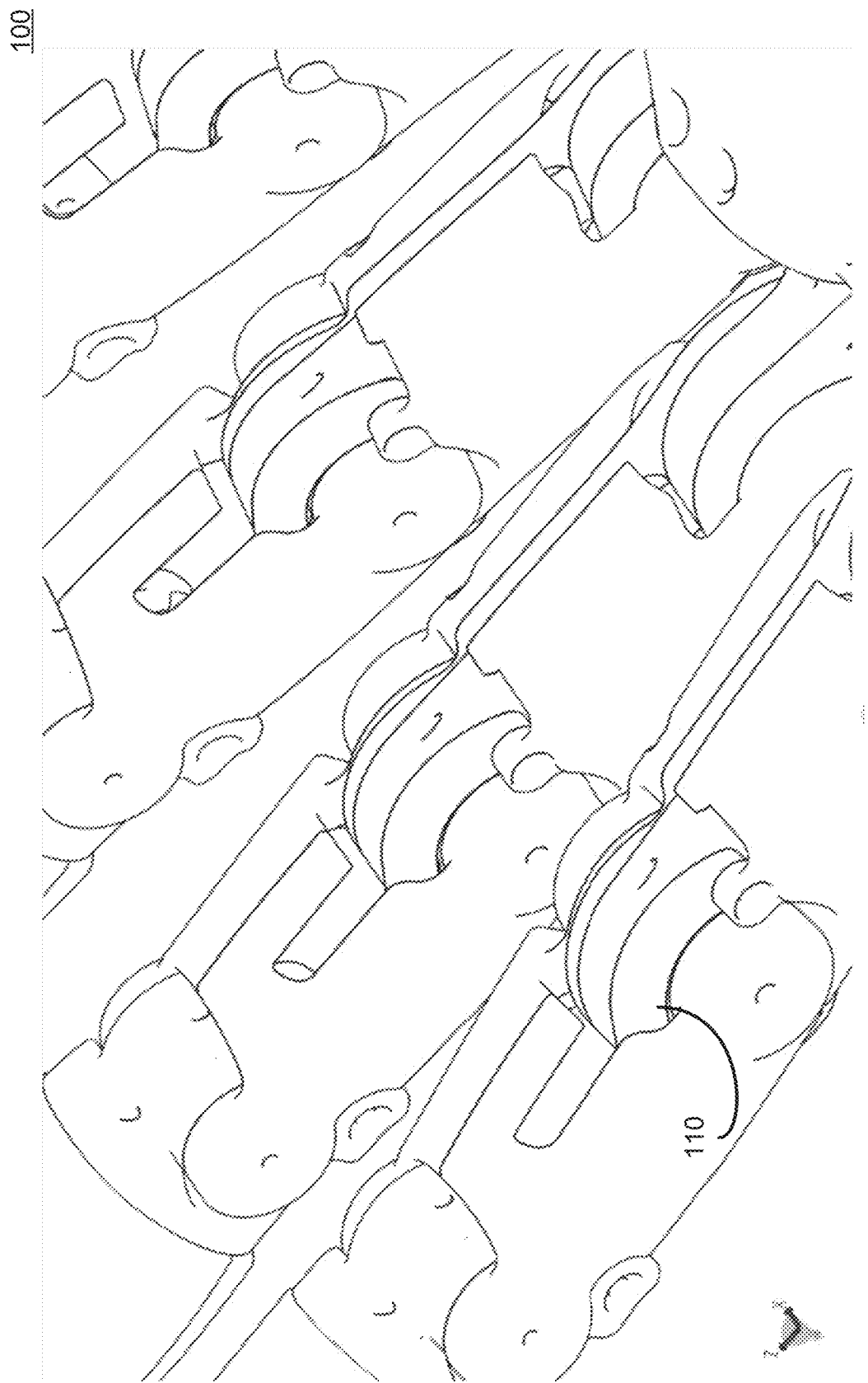
FIG. 1F shows an example view of a hand of a robot system with S-bars.

FIG. 1F shows a zoomed-in view of the hand 100. An s-bar 110 may be used to mechanically couple finger joint motion of the hand 100.

Figure 1G:
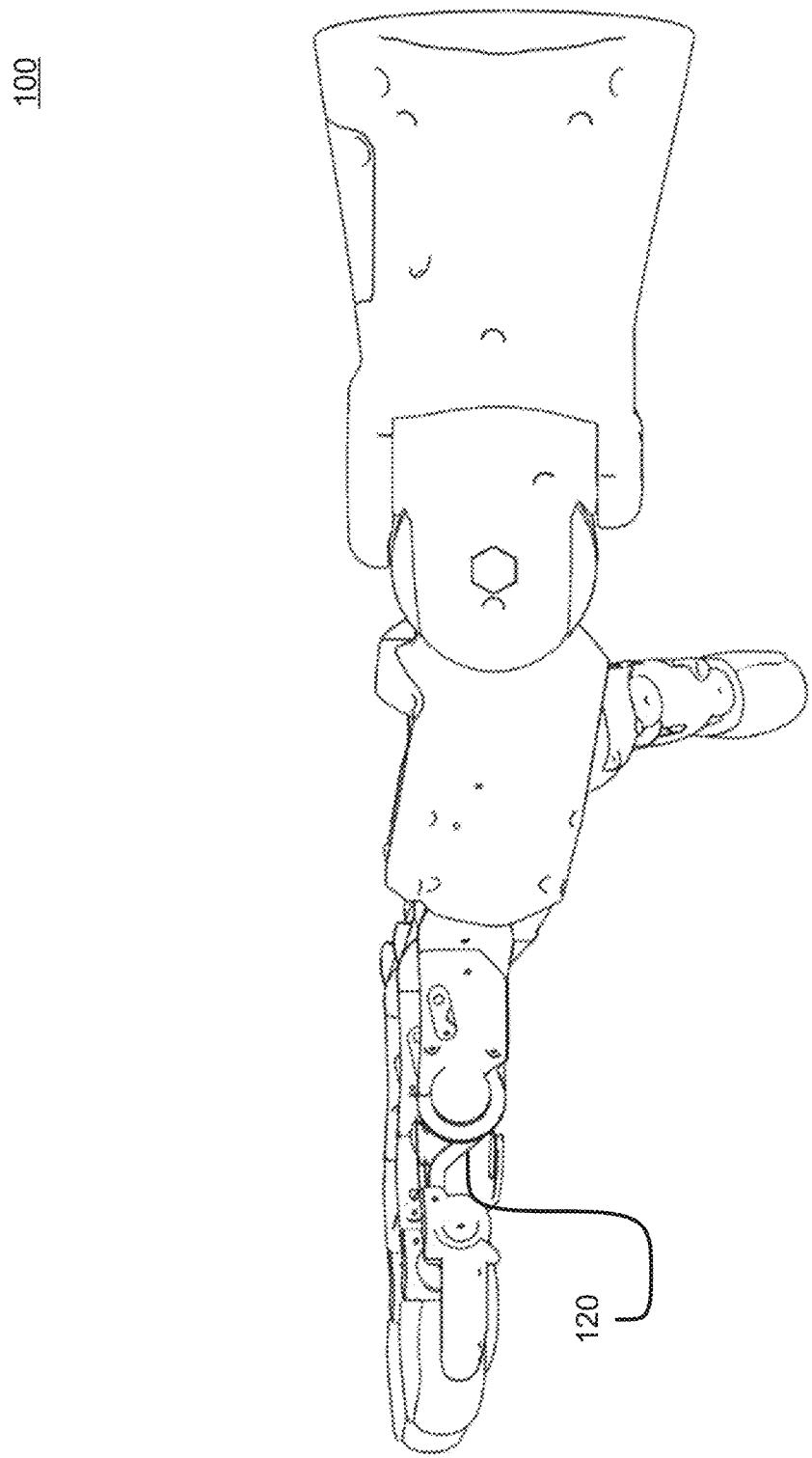
FIG. 1G shows an example view of a hand of a robot system with an S-bar.

FIG. 1G shows a zoomed-out view of the robot hand 100. The joint motion of one or more fingers may be mechanically coupled using an s-bar mechanism (e.g., such as the s-bar 120).

Figure 1H:
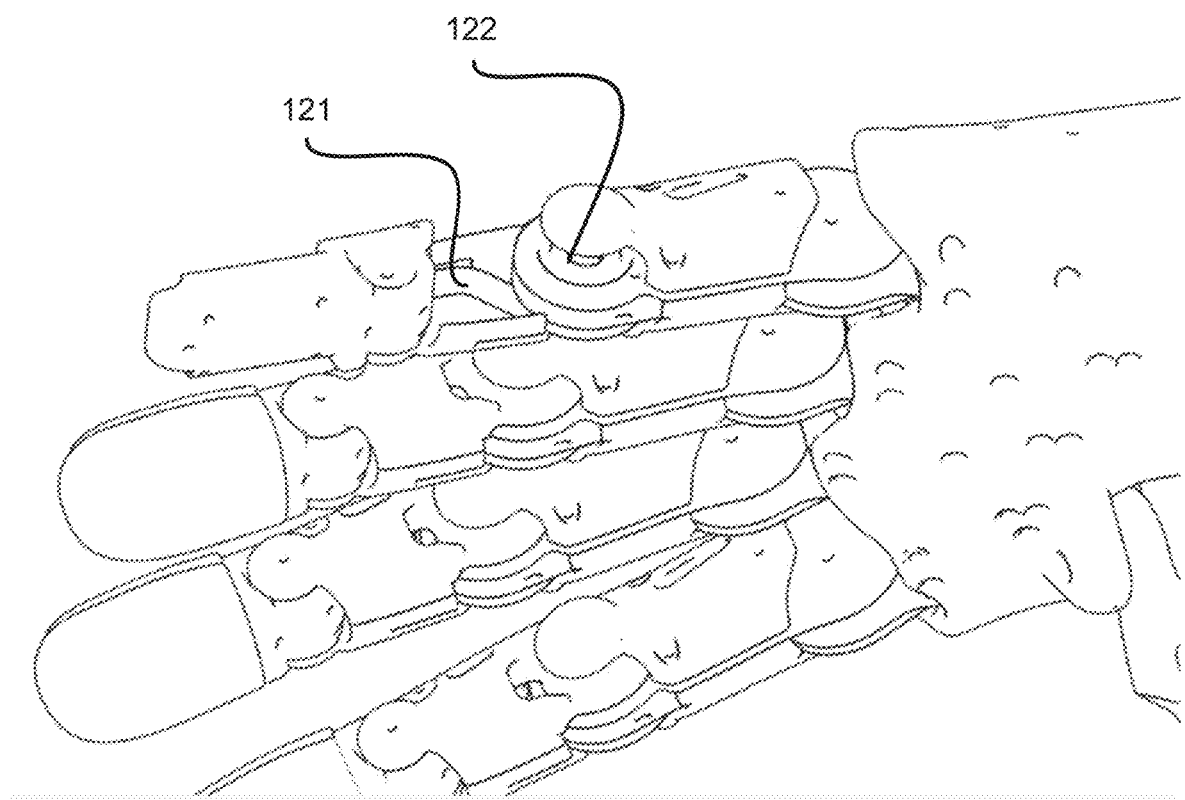
FIG. 1H shows an example view of a hand of a robot system with an S-bar.

FIG. 1H shows an angled view of the pinky of the robot hand 100. An s-bar 121 may be used to mechanically couple joint motion in the pinky. The s-bar 121 may be attached to the pinky of the robot hand 100 at a location that is behind a potentiometer 122.

Figure 1I:
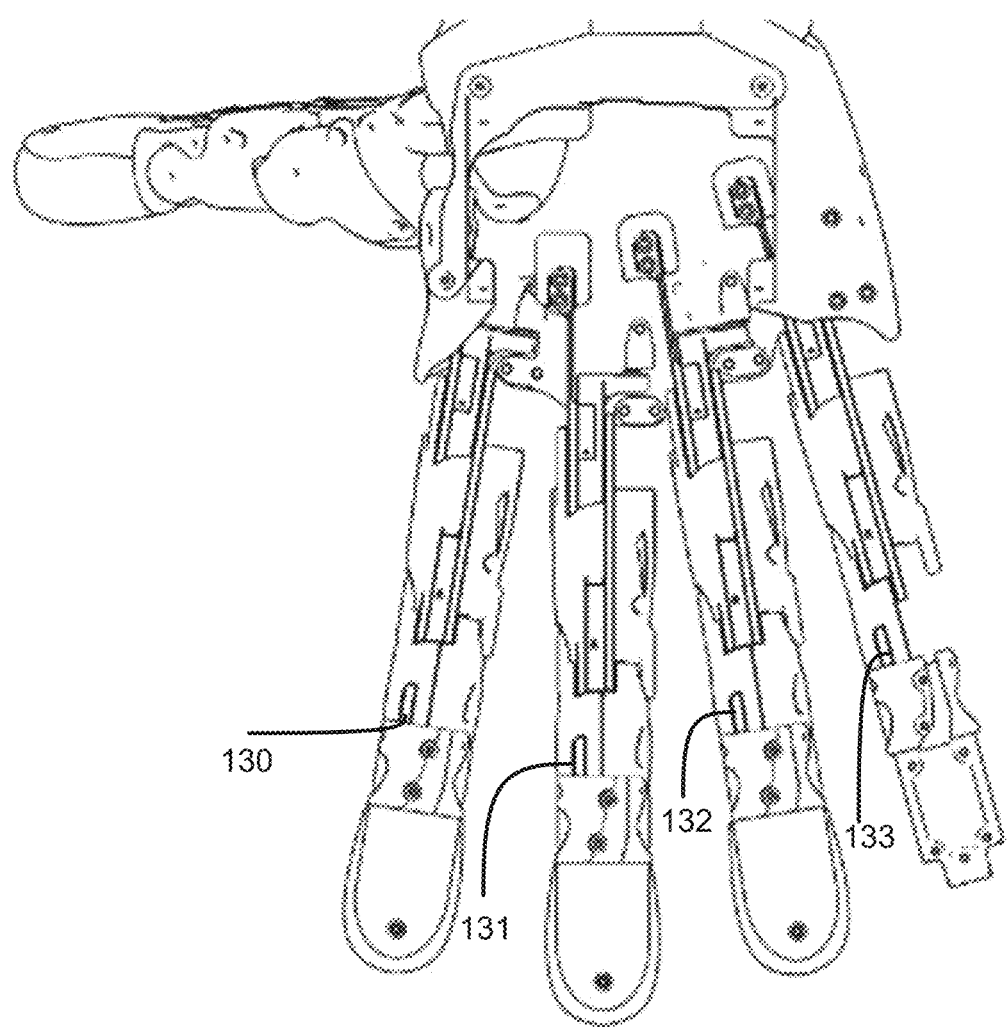
FIG. 1I shows an example view of a hand of a robot system with S-bars.

FIG. 1I shows a top-down view of the robot hand 100. A portion of s-bars 130-133 can be seen via the top-down view shown.

Figure 2A:
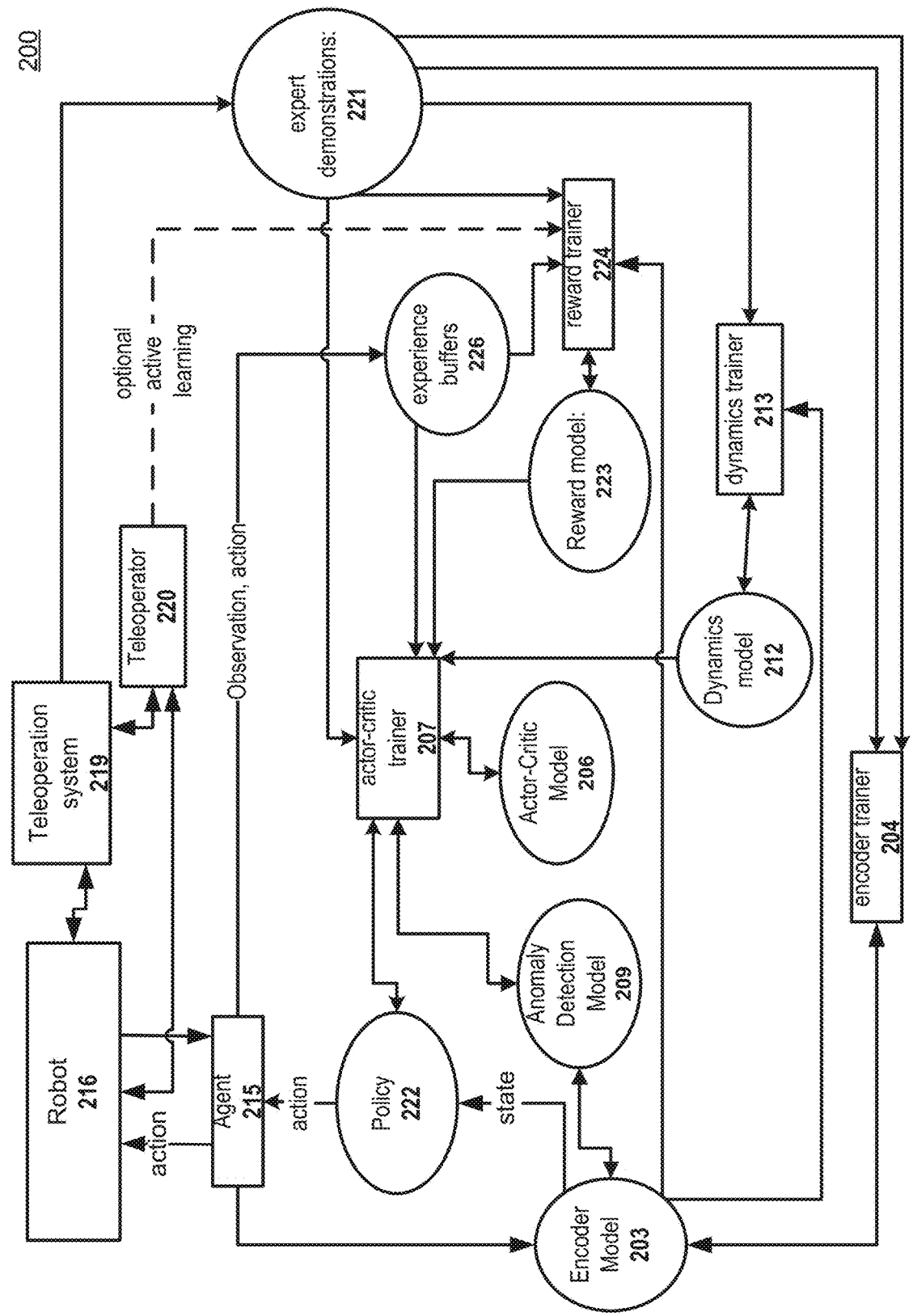
FIG. 2A shows an example computing system for training robots to perform tasks.

FIG. 2A shows an additional example of a system for using machine learning to train a robot (e.g., the robot system 102) to perform a task. One or more components shown in FIG. 2A may be implemented by the robot system 302, the teleoperation system 304, or the server 306 described below in connection with FIG. 3.

The system 200 may include a robot 216. The robot 216 may include any component of the robot system 302 discussed below in connection with FIG. 3. The robot 216 may include a hand such as the robot hand 100 discussed above in connection with FIGS. 1A-1I. The s-bars discussed in connection with FIGS. 1A-1I may be used to reduce state space or increase efficiency the efficiency of training one or more machine learning models discussed in connection with FIGS. 2-3. The robot 216 may be an anthropomorphic robot (e.g., with legs, arms, hands, or other parts), like those described in the application incorporated by reference. The robot may be an articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robots. The robot 216 may include one or more cameras, joints, servomotors, stepper motors, pneumatic actuators, or any other component discussed in application Ser. No. 16/18,999 entitled "Artificial Intelligence-Actuated Robot," which is incorporated by reference in its entirety. The robot 216 may communicate with the agent 215, and the agent 215 may be configured to send actions determined via the policy 222. The policy 222 may take as input the state (e.g., a vector representation generated by the encoder model 203) and return an action to perform.

The robot 216 may send sensor data to the encoder model 203, e.g., via the agent 215. The encoder model 203 may take as input the sensor data from the robot 216. The encoder model 203 may use the sensor data to generate a vector representation (e.g., a space embedding) indicating the state of the robot. The encoder model 203 may be trained via the encoder trainer 204. The encoder model may use the sensor data to generate a space embedding (e.g., a vector representation) indicating the state of the robot or the environment around the robot periodically (e.g., 30 times per second, 10 times per second, every two seconds, etc.). A space embedding may indicate a current position or state of the robot (e.g., the state of the robot after performing an action to turn a door handle. A space embedding may reduce the dimensionality of data received from sensors. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data to a space embedding in an embedding space (e.g., a space between 10 and 2000 dimensions in some embodiments). Distance between a first space embedding and a second space embedding may preserve the relative dissimilarity between the state of a robot associated with the first space embedding and the state of a robot (which may be the same or a different robot) associated with the second space embedding.

The anomaly detection model 209 may receive vector representations from the encoder model 203 and determine whether each vector representation is anomalous or not. Although only one encoder model 203 is shown in FIG. 2A, there may be multiple encoder models. A first encoder model may send space embeddings to the anomaly detection model 209 and a second encoder model may send space embeddings to other components of the system 200.

The dynamics model 212 may be trained by the dynamics trainer 213 to predict a next state given a current state and action that will be performed in the current state. The dynamics model may be trained by the dynamics trainer 213 based on data from expert demonstrations (e.g., performed by the teleoperator).

The actor-critic model 206 may be a reinforcement learning model. The actor-critic model 206 may be trained by the actor-critic trainer 207. The actor-critic model 206 may be used to determine actions for the robot 216 to perform. For example, the actor-critic model 206 may be used to adjust the policy by changing what actions are performed given an input state.

The actor-critic model 206 and the encoder model 203 may be configured to train based on outputs generated by each model 206 and model 203. For example, the system 200 may adjust a first weight of the encoder model 203 based on an action determined by a reinforcement learning model (e.g., the actor-critic model 206). Additionally or alternatively, the system 200 may adjust a second weight of the reinforcement learning model (e.g., the actor-critic model 206) based on the state (e.g., a space embedding) generated via the encoder model 203.

The reward model 223 may take as input a state of the robot 216 (e.g., the state may be generated by the encoder model 203) and output a reward. The robot 216 may receive a reward for completing a task or for making progress towards completing the task. The output from the reward model 223 may be used by the actor-critic trainer 207 and actor-critic model 206 to improve ability of the model 206 to determine actions that will lead to the completion of a task assigned to the robot 216. The reward trainer 224 may train the reward model 223 using data received via the teleoperation system 219 or via sampling data stored in the experience buffers 226. The teleoperation system 219 may be the teleoperation system 304 discussed below in connection with FIG. 3. In some embodiments, the system 200 may adjust a weight or bias of the reinforcement learning model (e.g., the actor-critic model 206), such as a deep reinforcement learning model, in response to determining that a space embedding (e.g., generated by the encoder model 203) corresponds to an anomaly. Adjusting a weight of the reinforcement model may reduce a likelihood of the robot of performing an action that leads to an anomalous state.

The experience buffers 226 may store data corresponding to actions taken by the robot 216 (e.g., actions, observations, and states resulting from the actions). The data may be used to determine rewards and train the reward model 223. Additionally or alternatively, the data stored by the experience buffers 226 may be used by the actor-critic trainer to train the actor-critic model 206 to determine actions for the robot 216 to perform. The teleoperation system 219 may be used by the teleoperator 220 to control the robot 216. The teleoperation system 219 may be used to record demonstrations of the robot performing the task. The demonstrations may be used to train the robot 216 and may include sequences of observations generated via the robot 216 (e.g., cameras, touch sensors, sensors in servomechanisms, or other parts of the robot 216).

Figure 2B:
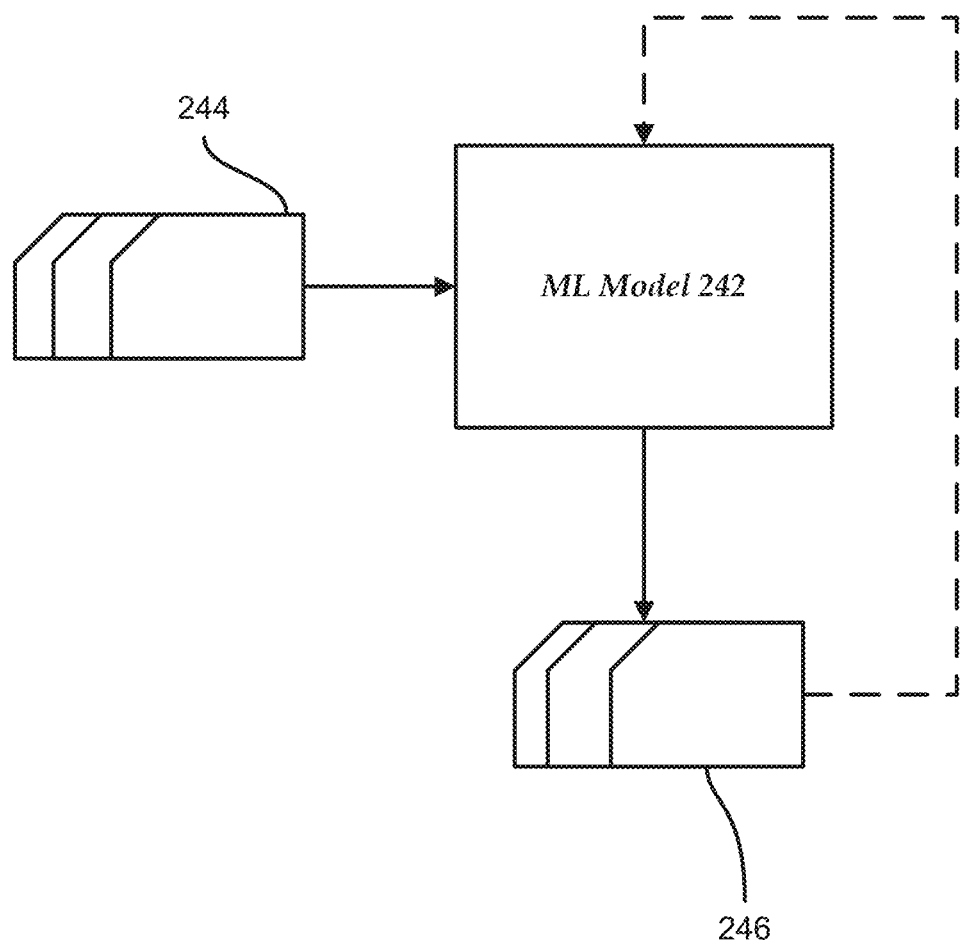
FIG. 2B shows an example machine learning model that may be used in accordance with some embodiments.

One or more machine learning models discussed herein may be implemented (e.g., in part), for example, as described in connection with the machine learning model 242 of FIG. 2B. With respect to FIG. 2B, machine learning model 242 may take inputs 244 and provide outputs 246. In one use case, outputs 246 may be fed back to machine learning model 242 as input to train machine learning model 242 (e.g., alone or in conjunction with user indications of the accuracy of outputs 246, labels associated with the inputs, or with other reference feedback and/or performance metric information). In another use case, machine learning model 242 may update its configurations (e.g., weights, biases, or other parameters) based on its assessment of its prediction (e.g., outputs 246) and reference feedback information (e.g., user indication of accuracy, reference labels, or other information). In another example use case, where machine learning model 242 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 242 may be trained to generate results (e.g., response time predictions, sentiment identifiers, urgency levels, etc.) with better recall, accuracy, and/or precision.

In some embodiments, the machine learning model 242 may include an artificial neural network. In such embodiments, machine learning model 242 may include an input layer and one or more hidden layers. Each neural unit of the machine learning model may be connected with one or more other neural units of the machine learning model 242. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 242 may be self-learning or trained, rather than explicitly programmed, and may perform significantly better in certain areas of problem solving, as compared to computer programs that do not use machine learning. During training, an output layer of the machine learning model 242 may correspond to a classification, and an input known to correspond to that classification may be input into an input layer of machine learning model during training. During testing, an input without a known classification may be input into the input layer, and a determined classification may be output. For example, the classification may be an indication of whether an action is predicted to be completed by a corresponding deadline or not. The machine learning model 242 trained by the ML subsystem 314 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 242 may be structured as a factorization machine model. The machine learning model 242 may be a non-linear model and/or supervised learning model that can perform classification and/or regression. For example, the machine learning model 242 may be a general-purpose supervised learning algorithm that the system uses for both classification and regression tasks. Alternatively, the machine learning model 242 may include a Bayesian model configured to perform variational inference, for example, to predict whether an action will be completed by the deadline. The machine learning model 242 may be implemented as a decision tree and/or as an ensemble model (e.g., using random forest, bagging, adaptive booster, gradient boost, XGBoost, etc.).

Figure 3:
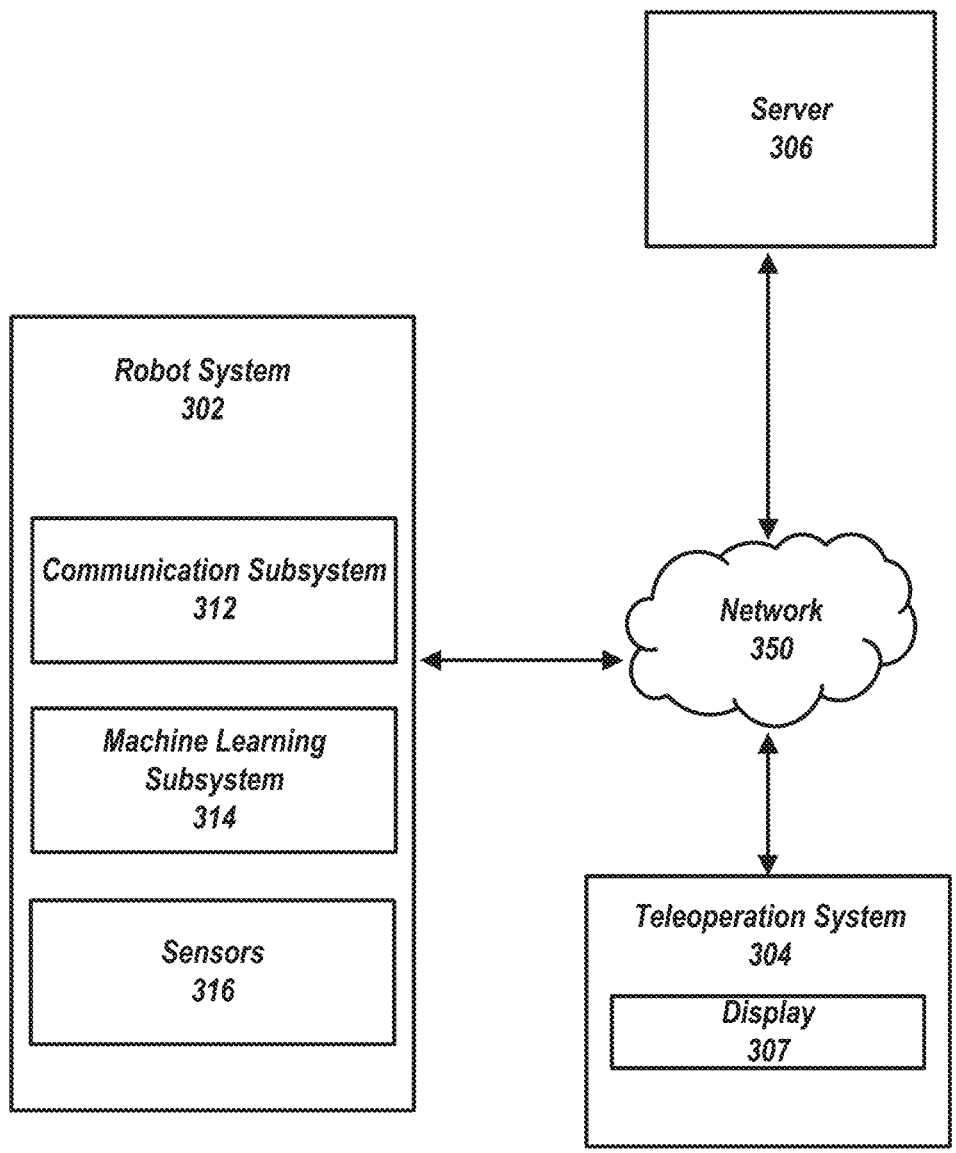
FIG. 3 shows an example computing system that uses machine learning and teleoperation to train robots, in accordance with some embodiments.

FIG. 3 shows an example computing system 300 for using machine learning to train robots (e.g., the robot system 302, the robot 216, etc.) to perform tasks. The computing system 300 may include a robot system 302, a teleoperation system 304, or a server 306. The robot system 302 may include a communication subsystem 312, a machine learning (ML) subsystem 314, and sensors 316.

The ML subsystem 314 may include a plurality of machine learning models. For example, the ML subsystem 314 may pipeline an encoder and a reinforcement learning model that are collectively trained with end-to-end learning, the encoder being operative to transform relatively high-dimensional outputs of a robot's sensor suite into lower-dimensional vector representations of each time slice in an embedding space, and the reinforcement learning model being configured to update setpoints for robot actuators based on those vectors. Some embodiments of the ML subsystem 314 may include an encoder model, a dynamic model, an actor-critic model, a reward model, an anomaly detection model, or a variety of other machine learning models (e.g., any model described in connection with FIG. 2A-2B, or ensembles thereof). One or more portions of the ML subsystem 314 may be implemented on the robot system 302, the server 306, or the teleoperation system 304. Although shown as distinct objects in FIG. 3, functionality described below in connection with the robot system 302, the server 306, or the teleoperation system 304 may be performed by any one of the robot system 302, the server 306, or the teleoperation system 304. The robot system 302, the server 306, or the teleoperation system 304 may communicate with each other via the network 350.

Figure 4:
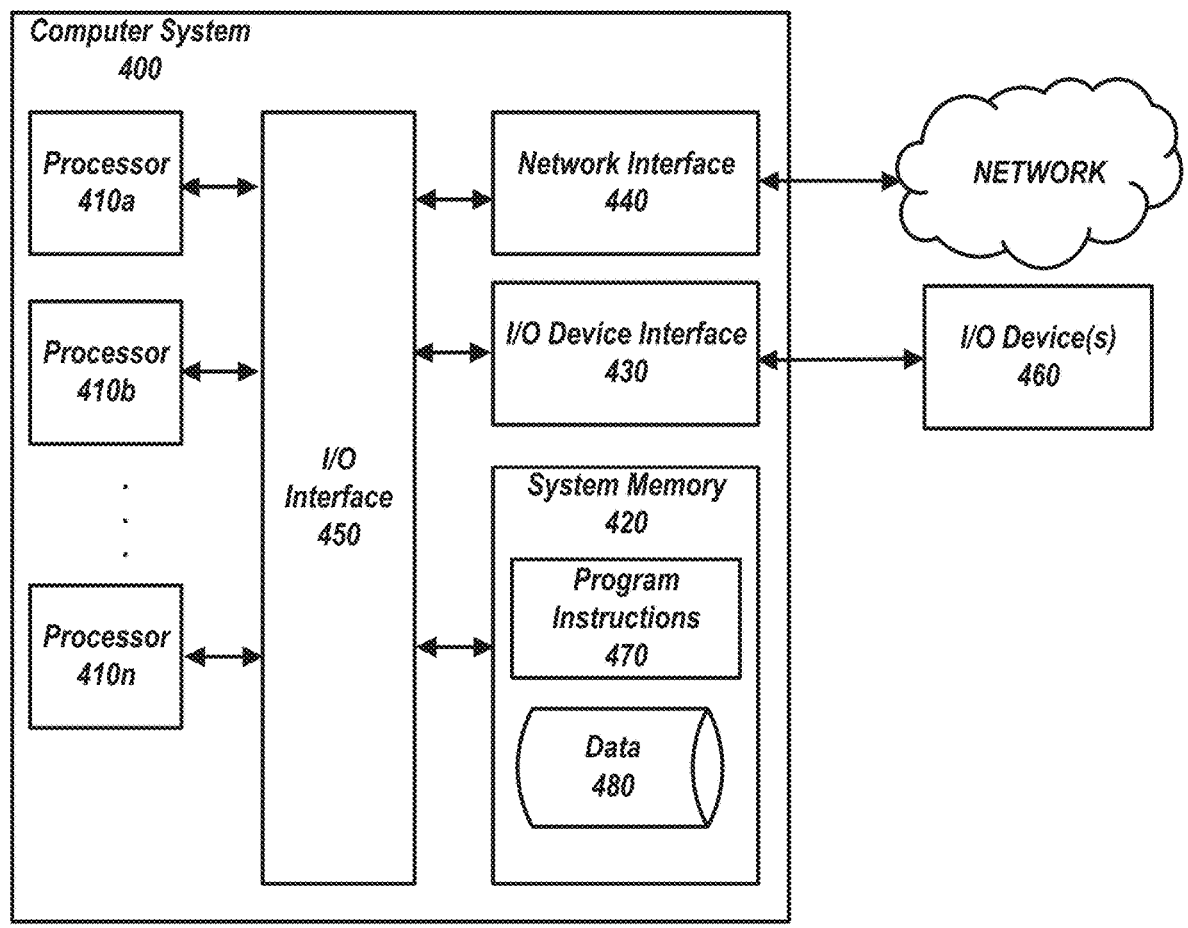
FIG. 4 shows an example computing system that may be used in accordance with some embodiments.
Figure 5:
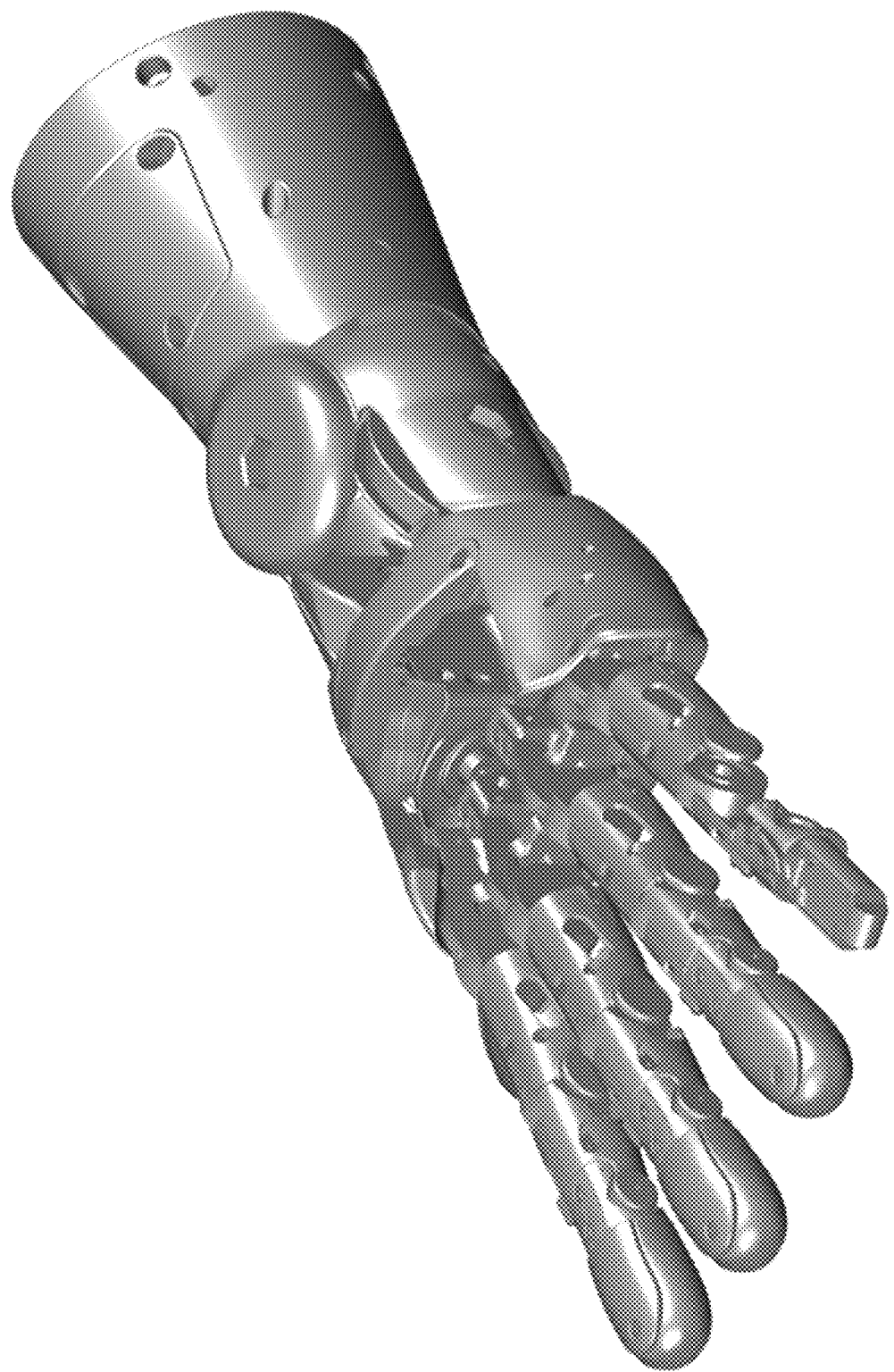
FIGS. 5-11 depict the hand of the robot system in greyscale from various perspectives.
Figure 6:
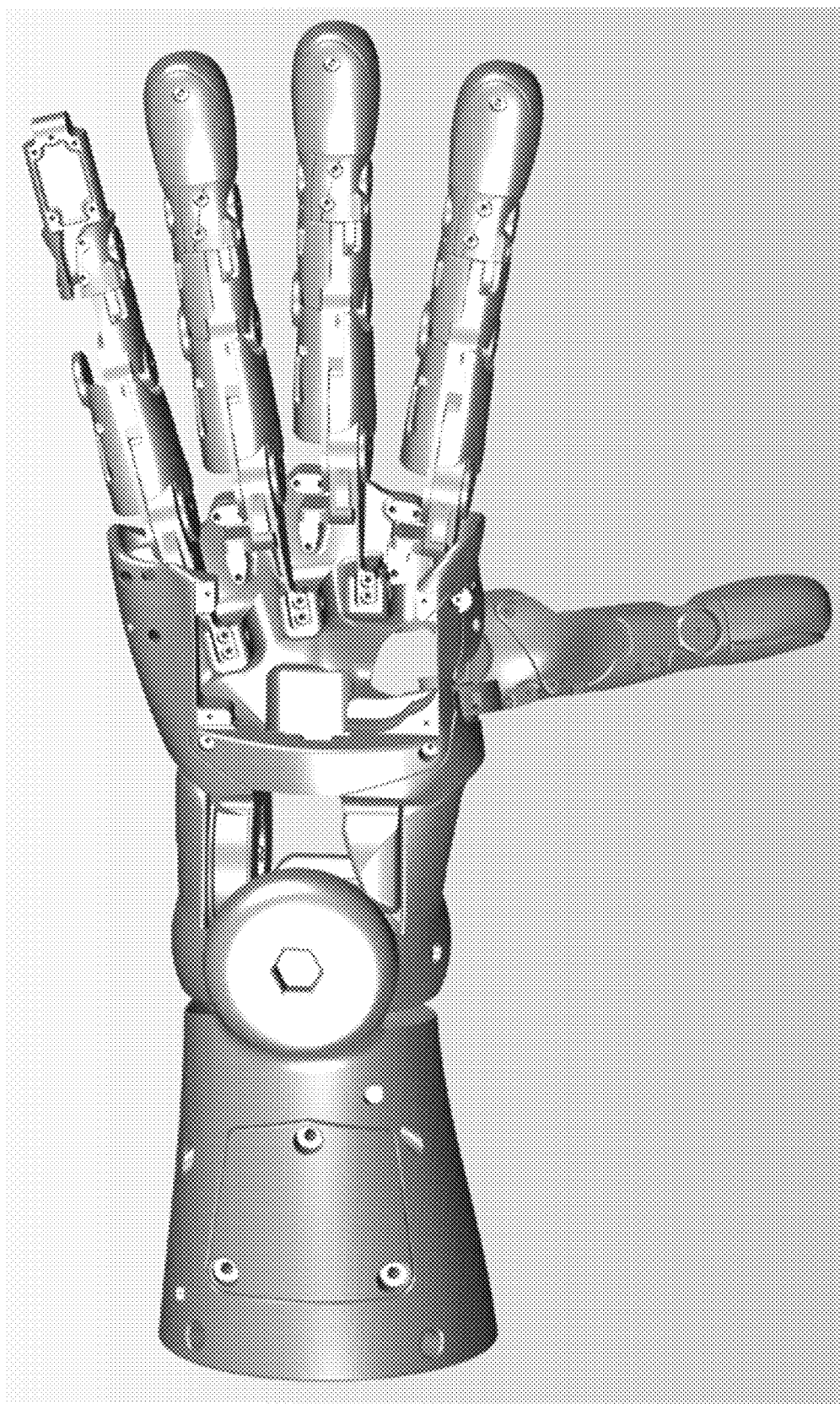
Figure 7:
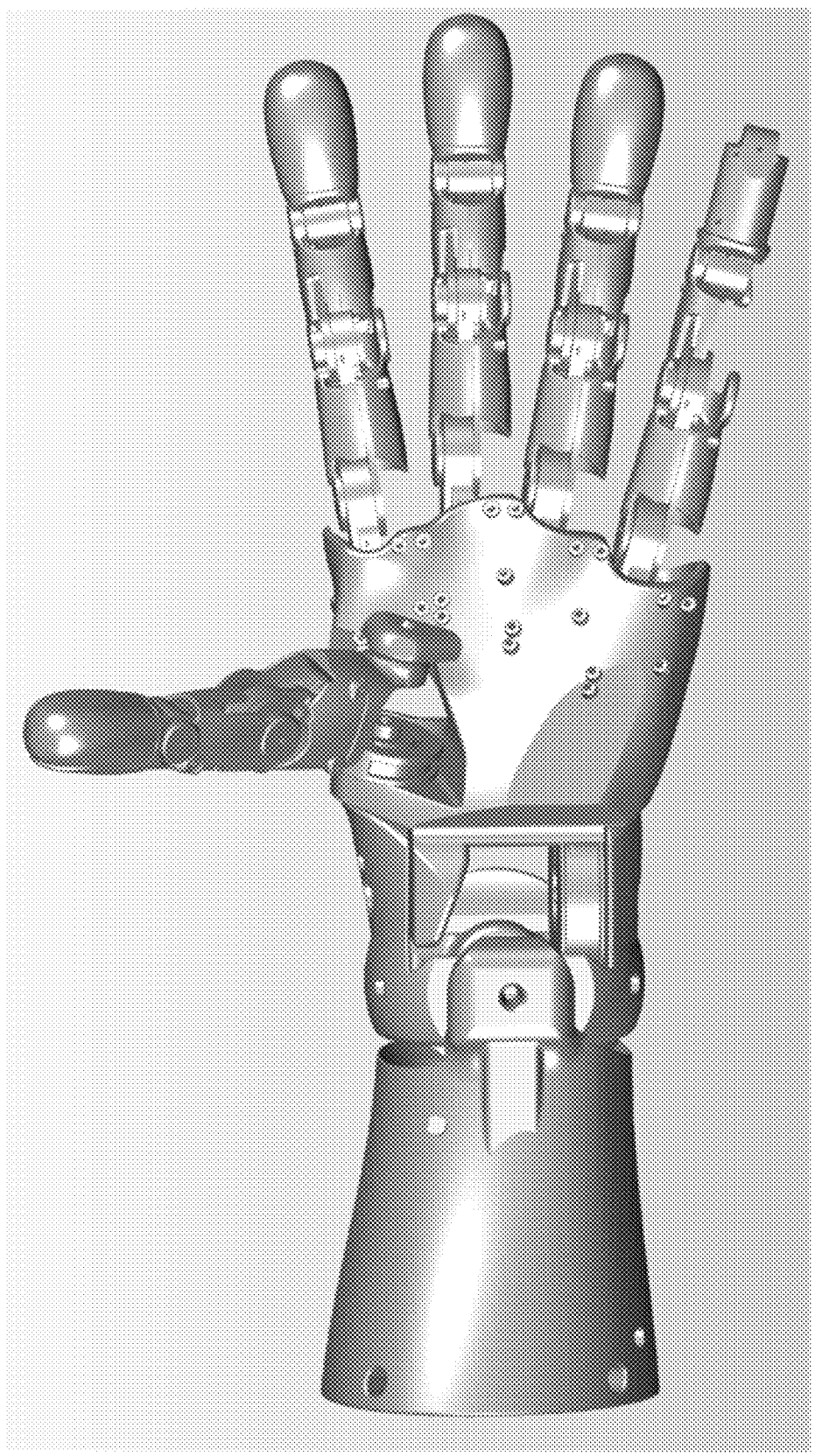
Figure 8:
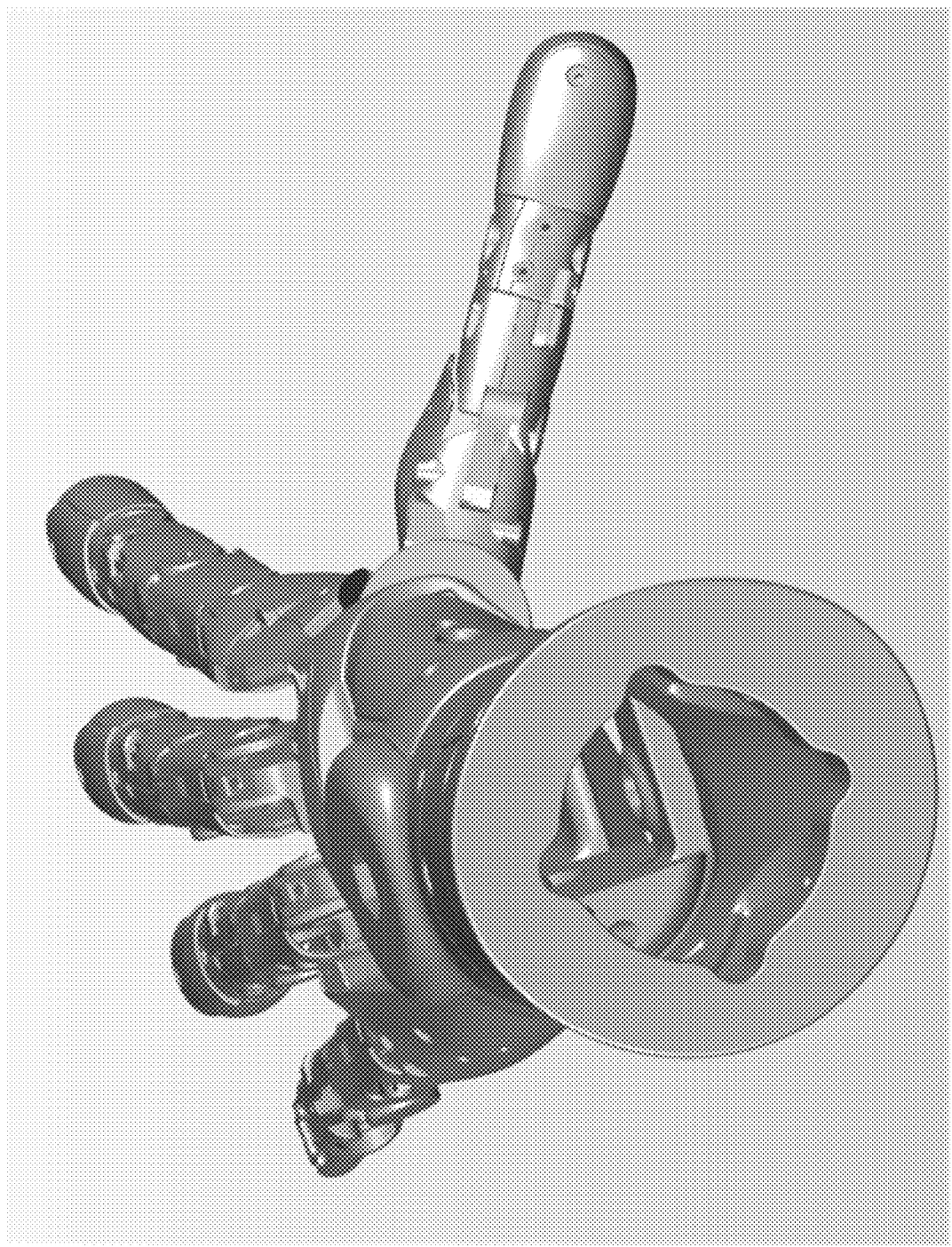
Figure 9:
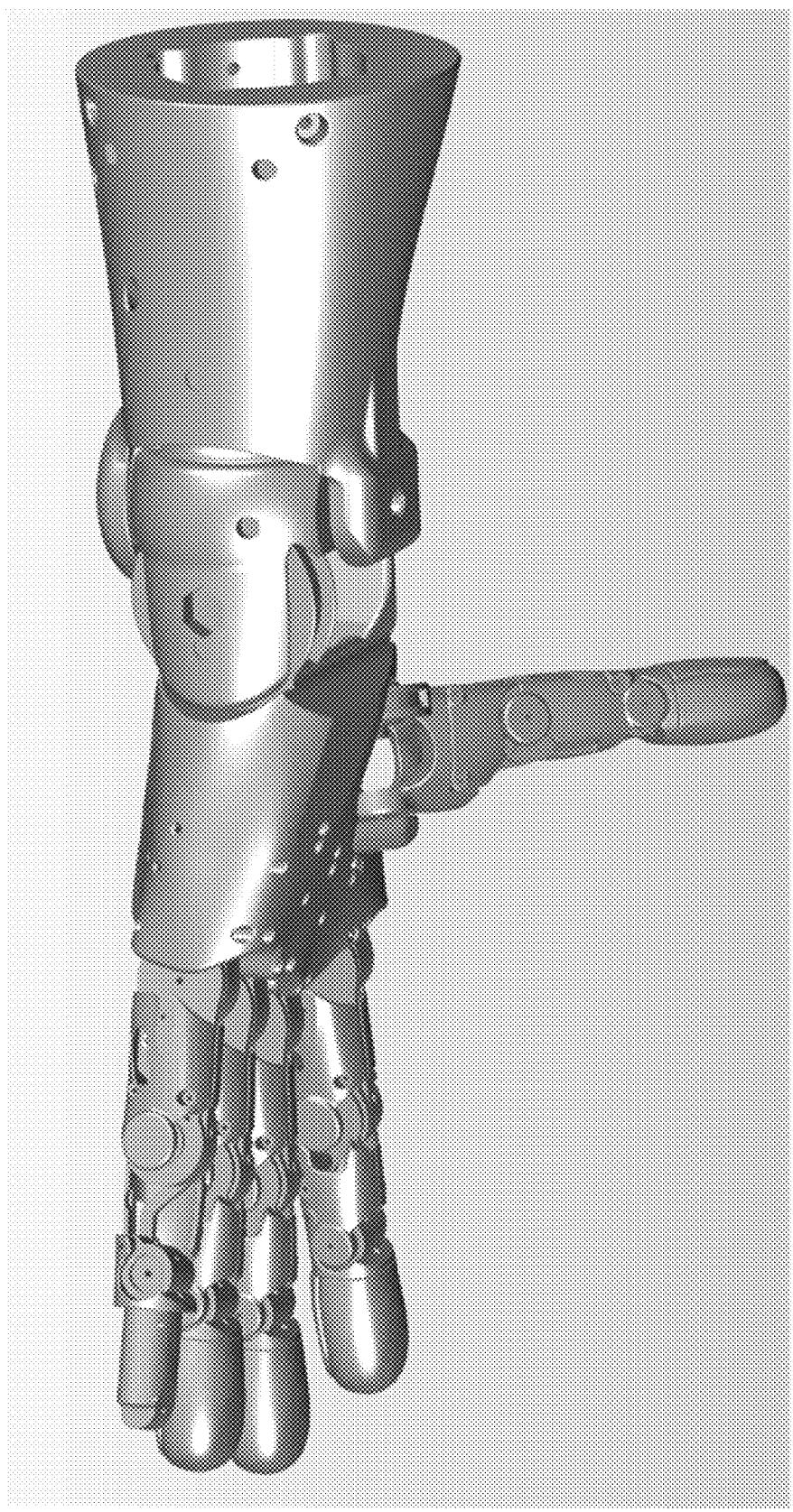
Figure 10:
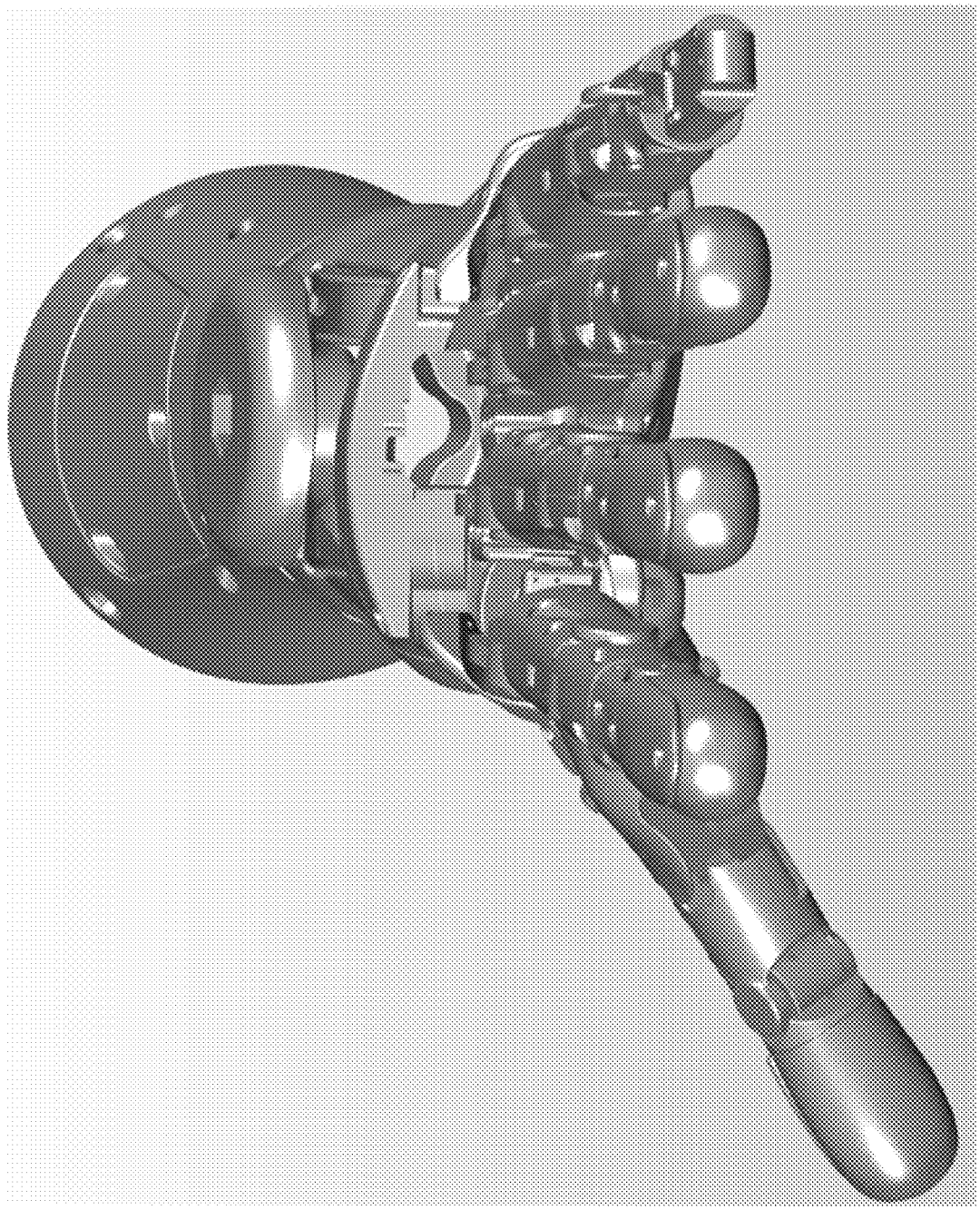
Figure 11:
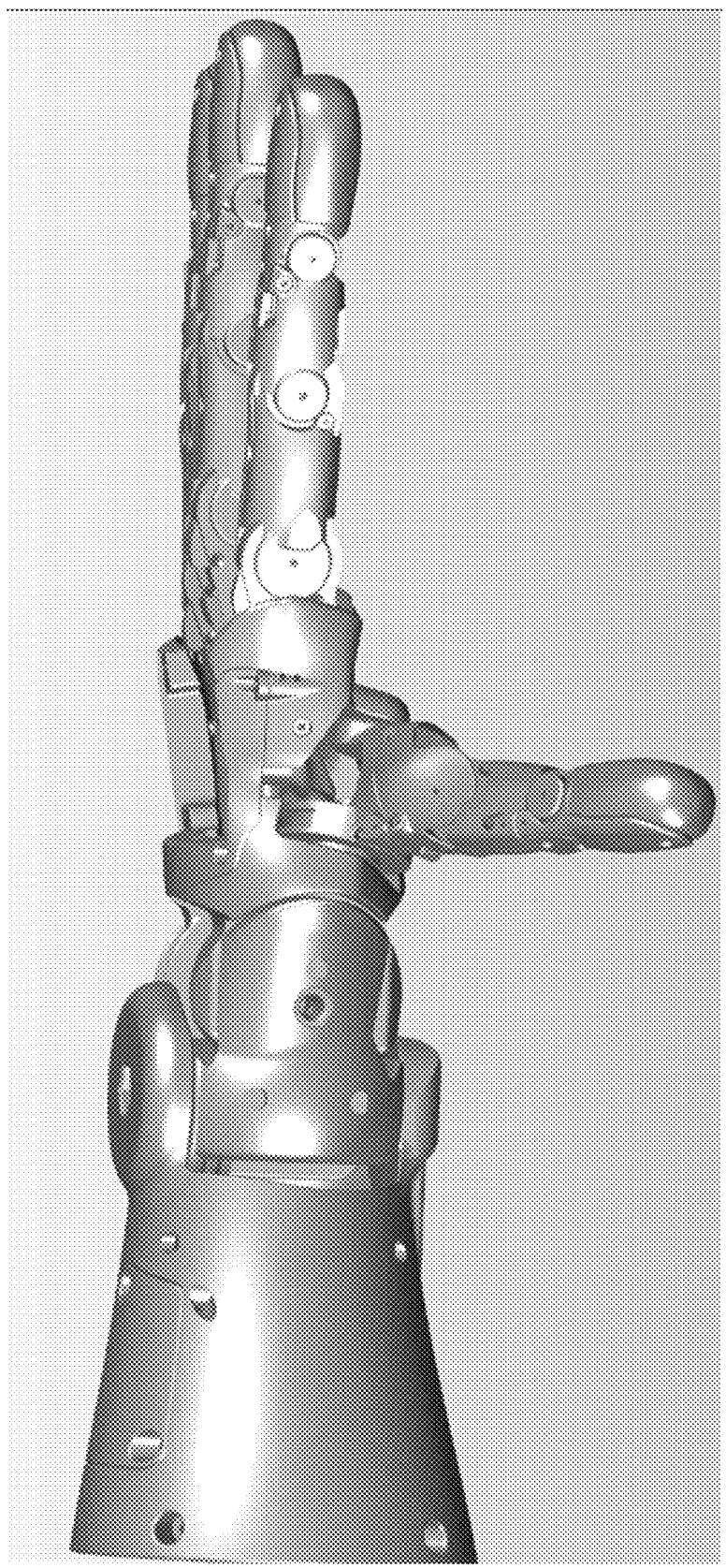

FIG. 4 is a diagram that illustrates an exemplary computing system 400 in accordance with embodiments of the present technique. Various portions of systems and methods described herein, may include or be executed on one or more computer systems similar to computing system 400. Further, processes and modules described herein may be executed by one or more processing systems similar to that of computing system 400.

Computing system 400 may include one or more processors (e.g., processors 410a-410n) coupled to system memory 420, an input/output I/O device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a units-processor system including one processor (e.g., processor 410a), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computing system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computing system 400 through a wired or wireless connection. I/O devices 460 may be connected to computing system 400 from a remote location. I/O devices 460 located on remote computer system, for example, may be connected to computing system 400 via a network and network interface 440.

Network interface 440 may include a network adapter that provides for connection of computing system 400 to a network. Network interface may 440 may facilitate data exchange between computing system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 470 or data 480. Program instructions 470 may be executable by a processor (e.g., one or more of processors 410a-410n) to implement one or more embodiments of the present techniques. Instructions 470 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 400 or multiple computer systems 400 configured to host different portions or instances of embodiments. Multiple computer systems 400 may provide for parallel or sequential processing/execution of one or more portions of the techniques described herein.

Those skilled in the art will appreciate that computing system 400 is merely illustrative and is not intended to limit the scope of the techniques described herein. Computing system 400 may include any combination of devices or software that may perform or otherwise provide for the performance of the techniques described herein. For example, computing system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 400 may be transmitted to computing system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The invention claimed is:

1. A robotic finger comprising:
a distal phalange;
an intermediate phalange including a cam; and
a distal interphalangeal joint formed between the distal phalange and the intermediate phalange, the distal interphalangeal joint comprising an s-bar having a first end coupled to the distal phalange and a second end coupled to the intermediate phalange, the s-bar including a curved bar section with a curved surface slidably engaged with the cam.

2. The robotic finger of claim 1, wherein the intermediate phalange is coupled to a proximal interphalangeal joint.

3. The robotic finger of claim 2, wherein the s-bar and the cam are configured such that rotation of one of the distal and proximal interphalangeal joints causes a different amount of rotation of the other of the distal and proximal interphalangeal joints.

4. The robotic finger of claim 3, wherein an amount of rotation of the distal interphalangeal joint is smaller than an amount of rotation of the proximal interphalangeal joint.

5. The robotic finger of claim 2, wherein the s-bar and the cam are configured such that the distal interphalangeal joint tracks the proximal interphalangeal joint in rotation through a first range of rotation and stops tracking the proximal joint when a maximum rotation is reached.

6. The robotic finger of claim 1, wherein the s-bar is made of a flexible material.

7. The robotic finger of claim 1, wherein the s-bar is made of a rubber material.

8. A robotic hand comprising:
a wrist; and
at least one finger coupled to the wrist, the at least one finger comprising:
a distal phalange;
an intermediate phalange including a cam; and
a distal interphalangeal joint formed between the distal phalange and the intermediate phalange, the distal interphalangeal joint comprising an s-bar having a first end coupled to the distal phalange and a second end coupled to the intermediate phalange, the s-bar including a curved bar section with a curved surface slidably engaged with the cam.

9. The robotic hand of claim 8, wherein the intermediate phalange is coupled to a proximal interphalangeal joint.

10. The robotic hand of claim 9, wherein the s-bar and the cam are configured such that rotation of one of the distal and proximal interphalangeal joints causes a different amount of rotation of the other of the distal and proximal interphalangeal joints.

11. The robotic hand of claim 10, wherein an amount of rotation of the distal interphalangeal joint is smaller than an amount of rotation of the proximal interphalangeal joint.

12. The robotic hand of claim 9, wherein the s-bar and the cam are configured such that the distal interphalangeal joint tracks the proximal interphalangeal joint in rotation through a first range of rotation and stops tracking the proximal joint when a maximum rotation is reached.

13. The robotic hand of claim 8, wherein the s-bar is made of a flexible material.

14. The robotic hand of claim 8, wherein the s-bar is made of a rubber material.

* * * * *